United States Patent
Gold

(10) Patent No.: US 6,937,701 B1
(45) Date of Patent: Aug. 30, 2005

(54) TELECOMMUNICATIONS NETWORK HAVING A SWITCH EQUIPPED WITH AN IVR PROVISIONING/MONITORING SYSTEM

(75) Inventor: Barry Gold, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 990 days.

(21) Appl. No.: 09/595,715

(22) Filed: Jun. 16, 2000

(51) Int. Cl.$^7$ ............................................. H04M 1/64
(52) U.S. Cl. .............................. 379/88.01; 379/201.12; 704/275
(58) Field of Search ........................... 379/88.01–88.04, 379/1–2, 9, 9.02, 14, 15.01–15.04, 37, 39, 201.02, 201.03, 201.04, 201.05, 201.12, 88.16; 704/270, 270.1, 275

(56) References Cited

U.S. PATENT DOCUMENTS

| | | | |
|---|---|---|---|
| 4,232,293 A | | 11/1980 | Harris |
| 4,319,086 A | | 3/1982 | Thompson |
| 4,440,989 A | | 4/1984 | Gibb |
| 5,367,670 A | * | 11/1994 | Ward et al. .................... 714/47 |
| 5,390,184 A | | 2/1995 | Morris |
| 5,509,009 A | | 4/1996 | Laycock et al. |
| 5,745,692 A | * | 4/1998 | Lohmann et al. ............ 709/223 |
| 5,812,977 A | * | 9/1998 | Douglas ....................... 704/275 |
| 5,974,384 A | * | 10/1999 | Yasuda ........................ 704/275 |
| 5,991,389 A | | 11/1999 | Ram et al. |
| 6,018,567 A | * | 1/2000 | Dulman ..................... 379/32.03 |
| 6,041,325 A | * | 3/2000 | Shah et al. ..................... 707/10 |
| 6,263,064 B1 | * | 7/2001 | O'Neal et al. ........... 379/201.03 |
| 6,324,273 B1 | * | 11/2001 | Alcott ..................... 379/201.03 |
| 6,363,411 B1 | * | 3/2002 | Dugan et al. ................ 709/202 |
| 6,389,126 B1 | * | 5/2002 | Bjornberg et al. ...... 379/201.03 |
| 2001/0038689 A1 | * | 11/2001 | Liljestrand et al. ..... 379/201.03 |
| 2001/0046284 A1 | * | 11/2001 | Alcott ..................... 379/201.03 |

* cited by examiner

*Primary Examiner*—Roland G Foster
(74) *Attorney, Agent, or Firm*—Haynes and Boone, LLP

(57) ABSTRACT

A switching device having an IVR provisioning/monitoring system and an associated method to reprovision and/or monitor a switch. Audible sounds are detected and analyzed to determine whether they are audibilized commands containing reprovisioning instructions. If so, the switch is reprovisioned in accordance with the instruction. To determine whether the detected audible sound is an audibilized command, the audible sound is digitized for comparison with plural recognizable commands. If the digitized audible sound matches a recognized command, then the corresponding reprovisioning instruction is executed. Prior to the reprovisioning analysis, the detected audible sounds are analyzed to determine whether they are an authorization code. If so, subsequent audible sounds are analyzed to determine whether they contain reprovisioning instructions. The system may be operated in a monitoring mode where events are propagated to an expert system module for determining whether an alert or notification should be issued in response to the event.

23 Claims, 6 Drawing Sheets

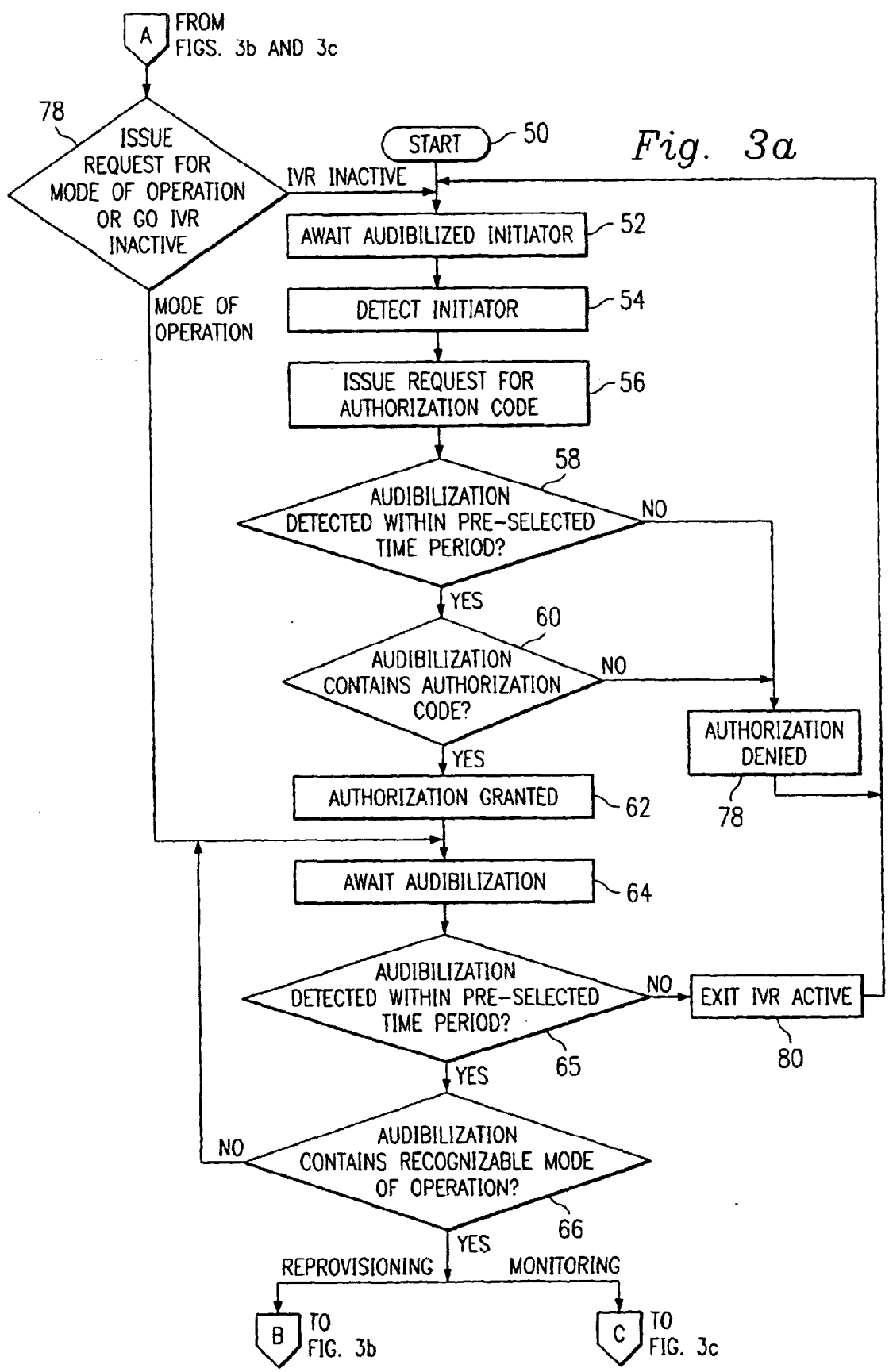

TELECOMMUNICATIONS NETWORK HAVING A SWITCH EQUIPPED WITH AN IVR PROVISIONING/MONITORING SYSTEM

TECHNICAL FIELD

The invention relates generally to telecommunications networks and, more particularly, to a switch equipped with an interactive voice response (or "IVR") system configured to perform both provisioning and monitoring operations.

BACKGROUND OF THE INVENTION

To complete a call requested by an originating agent, a switch must interact with the originating agent in order to collect the information needed to setup and route the call to a terminating agent. Furthermore, the switch must be supplied (or "provisioned") with information on how to conduct the interaction with the originating agent. Resource provisioning provides the switch with the information necessary for interaction with the originating agent. For example, an interaction protocol for a trunk group to which the originating agent belongs would be part of the resource provisioning provided to the switching device. Interaction provisioning defines the "dialing plan", i.e., the interaction between the switch and the originating agent that must occur in order for the switch to collect the information needed to setup and route the call. Subscriber provisioning defines the types of subscriber numbers which the switch acquires from the originating agent for use in authorizing subscribers and subscriber-based features. Finally, translations provisioning provides the switch with the information necessary for interaction with the terminating agent. These various provisionings of the switch may be collectively viewed as an interaction framework which controls interactions between the switching and the originating and/or terminating agents.

In certain prior configurations, switches were provisioned by physically hardcoding the interaction framework into the switch itself. Accordingly, the interaction framework for such switches have always been considered relatively inflexible in that, once in place, a modification to the interaction framework required the service provider, typically, the owner of the switch, to retain the services of the manufacturer to recode the switch. As a result, modifying the interaction framework of a switch often cost many thousands of dollars and required months, and sometimes even years, to complete.

In recent years, considerable efforts have been made to increase flexibility in modifying the interaction framework for a switch. As a result, switch configurations, for example, the most recent commercially available versions of the DMS-250 switch manufactured by Nortel Networks Corporation of Montreal, Canada, include certain capabilities that enable access providers to readily modify (or "reprovision") the interaction framework of the switch. To do so, a call processing (or "CALLP") application of the switch was configured for interactions with originating and/or terminating agents in accordance with a flexible interaction framework defined in software. More specifically, stored in a memory subsystem of the switch is the resource, interaction, subscriber and translations provisioning information needed for the CALLP application to interact with the originating and/or terminating agents. The provisioning information was stored in the memory subsystem as a collection of tables, each of which maintained, in the form of executable script, a respective type of selectable provisioning information. A user interface enabled a system administrator to reprovision the CALLP application of the switch by selecting desired executable scripts from the collection of tables and incorporating the selected scripts into the flexible interaction framework. Later, when the switch handles a call, the flexible interaction framework incorporating the newly selected scripts would be used to define how the CALLP application handles interactions with the originating and/or terminating agents during the setup and routing of a call therebetween.

While the use of a flexible interaction framework within a switch greatly enhanced the ability of the system administrator to selectively reprovision that switch, reprovisioning has remained a difficult task because of the syntactical complexity of the scripts maintained in the memory subsystem as a collection of tables. For example, resource provisioning of a switch appears to be a simple task in that it merely requires the selection of appropriate scripts from TRKGRP, TRKSIG, TRKFEAT, FLEXDIAL and MSGCTR tables. However, the difficulty of this task can be readily appreciated by merely reviewing a typical example of resource provisioning for a switch:

```
TRKGRP
    ACC670TWMFWK
        GRPTYP: AXXESS
        TRAFSNO: 9
        PADGRP: NDPGP
        NCCLS: NCIT
        SELSEQ: MIDL
        SIGIDX: MF_WK_IDX
        FEATIDX: AXX670_IDX
        DPIDX: I_OLI_ANI_CV
               ITC_AU_SD_AD
        OGRPTYPE: EANT
TRKFEAT
    AXX670
        ORIGOPTS:   (ALTTRTMT) (OHQ) (REORIGAL $) (SNPA
                    214) (SNXX 684) (TIMEBI8AS -2) TRKCOS
                    6) (MSGCTR 670)$
        TERMOPTS:   (NOANSDUR 10 TRMT RODR)
                    (OHQTERM) SNPA 703) (TRKCOS 6)$
MSGCTR
    670
        ADDRESS:    (ADDR PRTNM EAN) (OLI PRTNM EAPT)
                    (ADDR OPER NORMAL OFRT 1 EAN OFRT
                    2)$
TRKSIG
    MF_WK_IDX
        SIGTYPE: DS1
        IPULSETYP: MF
        ISTARTSG: WK
        PSEIZTMR: 5
        PDILTMR: 5
        MINRTMR: 2
        FDIGMASK: KP
        LDIGMASK: ST STP ST2P ST3P
        DIALMODE: M
        OSTARTSG: WK
        OPULSETYP: MF
        OIDGTMR: 6
        TRKGRDTM: 70
        OPTIONS:    (ANSWFLTR 16) (DELIVER CGNONLY)
                    (ACKWINK) (MLTSTAGE) (ODSCFLTR 16)
                    (ORIGFLTR 7) (REMBSY) (TDSCFLTR 16)$
```

From the foregoing example of resource provisioning, it should be readily appreciated that a technician must have a high level of expertise in order to be able to reprovision or otherwise maintain existing switches. However, as the demand for voice, data and other telecommunication services continues to grow, it has become increasingly difficult for service providers to find sufficient numbers of technicians with the requisite expertise needed to reprovision the constantly growing number of switches. It is, therefore, the object of this invention to provide a switch with a highly simplified human interface that enables lesser skilled technicians to reprovision and/or otherwise maintain the switch.

SUMMARY OF THE INVENTION

In one embodiment, the present invention is directed to a switch for a telecommunications network which includes a call processing application for interacting with originating and terminating agents, a switch reprovisioning system for reprovisioning the call processing application for the interactions and a user interface configured for receiving voice commands issued by a switch administrator for transmission to the switch reprovisioning system and for generating audibilized responses, issued by the switch reprovisioning system, for transmission to the switch administrator. In one aspect thereof, the switch further includes an interaction application coupled to the reprovisioning system and the call processor application and at least one provisioning table which contains provisioning instructions. In response to receipt of voice commands from the user interface, the interaction application modifies the interaction framework for the call processing application using selected ones of the provisioning instructions.

In a further aspect of this embodiment of the invention, the switch reprovisioning system further includes a voice recognition application coupled between the user interface and the interaction application and a recognizable audible input table coupled to the voice recognition application. The voice recognition application detects audible sounds and determines if the detected audible sounds correspond to any one of plural recognizable instructions maintained in the recognizable audible input table. If a recognizable instruction corresponding to the detected audible sound is identified, the voice recognition application issues the corresponding recognizable instruction to the interaction application. In turn, the interaction application modifies the interaction framework using the received instruction. In various further aspects thereof, the recognizable instructions may include provisioning information such as resource provisioning information for use in modifying interactions between the switch and originating agents, interaction provisioning information for use in modifying interactions between the switch and originating agents for collecting information related to call set-up and call routing, subscriber provisioning information for use in modifying interactions between the switch and originating agents for collecting information related to subscriber authorization or translations provisioning information for use in modifying interactions between the switch and the terminating agents.

In a still further aspect of this embodiment of the invention, the reprovisioning system further includes a voice generation application coupled between the user interface and the interaction application and an output audibilization table coupled to the voice generation application. In response to receipt of replies issued by the interaction module in response to the provisioning instructions issued by the voice recognition application, the voice generation application uses audibilizations maintained by the output audibilization table to generate audible messages for transmission to the user interface. In another, the user interface further includes an audio input device for detecting audible sounds, an A/D converter for converting audible sounds received from the audio input device into digitized signals for transmission to the voice recognition application, an audio output device for generating audible sounds, and a D/A converter for converting digitized signals received from the voice generation application into audible sounds for transmission to the audio output device.

In another embodiment, the present invention is directed to a switch for a telecommunications network which includes at least one hardware component, at least one software component, a switch monitoring system coupled to each one of the hardware and software components, a voice generation application coupled to the switch monitoring system and a user interface coupled to the voice generation application. The switch monitoring system receives operational information from the hardware and/or software components and determines, based upon the received operational information, whether audible notifications related to operating conditions at the switch should be issued. If the switch monitoring system determines that audible notifications should be issued, the switch monitoring system instructs the voice generating equipment to generate digitized messages. The digitized messages are transmitted to the user interface and used to generate audible sounds.

In one aspect of this embodiment of the present invention, the switch monitoring system includes an expert system application and a rules table. The expert system application receives operational information from the hardware-based and software-based switch components. Based upon the received operational information and information governing operation of the switch maintained in the rules table, the expert system application determines whether to issue an action-initiating command also maintained in the rules table. In one further aspect thereof, the rules table contains a plurality of operating conditions, at least one action associated with each operating condition and a numerical value or weight for each such action. In this aspect, the expert system application employs fuzzy logic to rank the actions in response to the monitoring of an occurrence of one or more operating conditions and then initiates a highest ranking one of the actions.

In an alternate further aspect thereof, the rules table contains a set of rules governing operation of the switch. Each rule includes an operating condition for the switch and an action to be initiated if the operating condition is met. In another alternate further aspect of the invention, the switch monitoring system further includes a an output audibilization table coupled to the voice generation application. The output audibilization table maintains audibilizations for use, by the expert system, to generate audible messages for transmission to the user interface. In a still further aspect, the user interface is comprised of a digital-to-analog (or "D/A") converter and an audio output device. The D/A converter converts digitized signals received from the voice generation application into analog signals. In turn, the analog signals are transmitted to the audio output device for generation of audible sounds therefrom.

In a further aspect of this embodiment of the invention, the switch further includes a call processing application, an interaction application coupled to the call processing application and a provisioning table coupled to the interaction application. The provisioning table maintains instructions suitable for use by the call processing application. The interaction application constructs and/or modifies an interaction framework using selected ones of the instructions maintained in the provisioning table. Interactions between the call processing application and originating and/or terminating agents are handled in accordance with the interaction framework constructed and/or modified by the interaction application.

In a still further aspect thereof, the switch monitoring system is instead configured to be a combination switch provisioning/monitoring system. In this aspect, a provisioning system is coupled to the call processing application, a voice recognition application is coupled between the human interface and the interaction application and a recognizable audible input table is coupled to the voice recognition application. The provisioning system reprovisions the call processing application for interactions with originating and terminating agents. Voice commands issued by a switch administrator are received by the human interface and transmitted to the provisioning/monitoring system. Using plural recognizable instructions maintained by the recognizable audible input table, the voice recognition system determines if detected audible sounds such as the voice commands issued by the switch administrator corresponds to a recognizable instruction. If so, the corresponding recognizable instructions are transmitted to the interaction application for use in modifying the interaction framework for the switch. Responses issued by the provisioning/monitoring system, such as confirmation of modifications to the interaction framework are transmitted back to the switch administrator.

In still further aspects thereof, the provisioning/monitoring system may further include a voice generation application coupled between the human interface and the interaction application and an output audibilization table coupled to the voice generation application. The output audibilization table maintains a plurality of audibilizations for use, by the voice generation application, to generate, from the messages received from the provisioning monitoring system, audible messages for transmission to the human interface. In further accordance with this aspect of the invention, the human interface may further include an audio input device, an analog-to-digital (or "A/D") converter, a D/A converter and an audio output device. Audible sounds detected by the audio input device are input the A/D converter for digitization. The digitized signal is then transmitted to the voice recognition module for analysis in the above-described manner. Conversely, digitized signals output by the voice generation module are input the D/A converter for conversion into an analog audio signals. The analog audio signals are then converted into audible sound by the audio output device.

In yet another embodiment, the present invention is directed to a method for reprovisioning a switch. Audible sounds are detected and analyzed to determine if they are audibilized commands which contains a reprovisioning instructions. If an audible sound is determined to be an audibilized command containing reprovisioning instructions, the switch is reprovisioned in accordance with the reprovisioning instruction. In one aspect thereof, to determine if the detected audible sound is an audibilized command containing reprovisioning instructions, the audible sound is digitized for comparison with plural recognizable commands. If the digitized audible sound matches one of the recognizable commands, reprovisioning instructions contained in the digitized audible sound is executed. In a further aspect thereof, prior to analyzing detected audible sounds to determine if they are audibilized commands containing reprovisioning instructions, the detected audible sounds are instead analyzed to determine if they are an authorization code. If an authorization code is detected, subsequent audible sounds are analyzed to determine if they are audibilized commands containing reprovisioning instructions. Preferably, prior to analyzing detected audible sounds to determine if they are an authorization code, a request for an authorization code is issued upon detection of an initial audible sound.

BRIEF DESCRIPTION OF THE DRAWINGS

FIG. 3a flow chart of a method of operating the IVR provisioning/monitoring system of FIG. 2 when installed within the switching device of FIG. 1.

DETAILED DESCRIPTION

Figure 1:
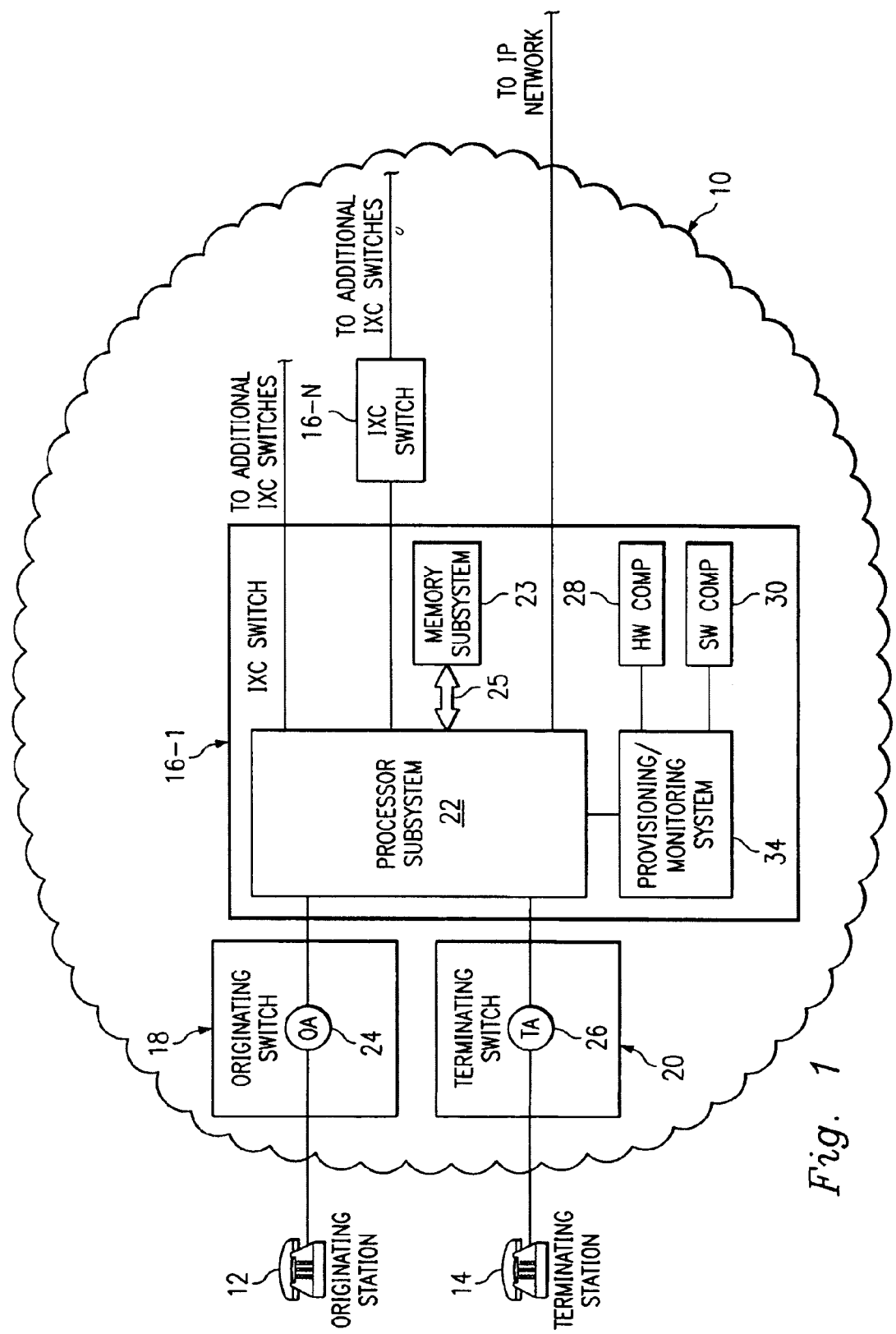
FIG. 1 is a block diagram of a telecommunications network which includes a switching device constructed in accordance with the teachings of the present invention and equipped with an IVR provisioning/monitoring system heretofore undisclosed in the art.

Referring first to FIG. 1, the reference numeral 10 designates a telecommunications network. While, in the disclosed embodiment of the invention, a public switched telephone network (or "PSTN") is selected as the telecommunications network 10, it should be clearly understood that the invention is equally suitable for use with other types of telecommunication networks. The telecommunications network 10 includes plural interexchange carrier (or "IXC") switches 16-1 through 16-N, two of which are shown here by way of example. Depending on the respective location of originating and terminating stations 12 and 14, the IXC switches 16-1 through 16-N either collectively or individually direct a call initiated by the originating station 12 to the destination station 14. It should be noted that, in the embodiment of the invention disclosed herein, the originating and terminating stations 12 and 14 are originating and terminating voice terminals, respectively, for the call. In an alternate embodiment of the invention not illustrated herein, however, the originating and terminating stations 12 and 14 are trunks which couple the IXC switch 16-1 to other switches (not shown). The originating and terminating stations 12 and 14 are coupled to the IXC switch 16-1 by originating switch 18 and terminating switch 20, respectively. While, in various embodiments of the invention, the originating and terminating switches 18 and 20 may be local exchange carriers (or "LECs"), private branch exchanges (or "PBXs") or IXC switches, as disclosed herein, the originating and terminating switches 18 and 20 are LEC switches.

Before continuing further, it should be clearly understood that the PSTN or other telecommunications network 10 will typically include includes a wide array of other, conventional, devices which have been omitted from FIG. 1 for ease of illustration. Similarly, various components of the IXC switch 11, the originating switch 18 and the terminating switch 20 have also been omitted from FIG. 1, again for ease of illustration. Finally, while, as disclosed herein, the present invention resides within the IXC switch 16-1, it should be clearly understood that the invention is equally suitable for use in other telecommunication devices requiring periodic interactions with users.

Continuing to refer to FIG. 1, the IXC switch 16-1 is comprised of various hardware (or "HW") and software (or "SW") components which enable it to complete a requested connection between the originating and terminating stations 12 and 14. In many cases, the total number of hardware and software components which form part of the IXC switch 16-1 is too voluminous to permit the IXC switch 16-1 to be readily illustrated. As a result, a single HW component and a single SW component, specifically, the HW component 28 and the SW component 30, are shown in FIG. 1 and are intended to be representative of the plural HW and SW components which typically form part of an IXC switch such as the IXC switch 16-1.

In addition to the otherwise unspecified HW and SW components 28 and 30, the components of the IXC switch 16-1 further include a processor subsystem 22 and a memory subsystem 23. It should be clearly understood that these terms are not meant to necessarily respectively represent a single discrete device within the IXC switch 16-1. More specifically, by the term "processor subsystem", it is intended to refer to the collective processing capability within the IXC switch 16-1. Thus, it is fully contemplated that the processor subsystem 48 encompasses plural processing devices variously located within the IXC switch 16-1. As a result, if various software modules or applications are described as residing on the processor subsystem 22, it should be clearly understood that the variously described software modules may, in fact, reside on separate processing devices. Similarly, by the term "memory subsystem", it is intended to refer to the total available memory space within the IXC switch 16-1. As such, it is fully contemplated that the memory subsystem 23 encompasses the main, auxiliary, cache as well as any other type of memory device residing in the IXC switch 16-1. The processor and memory subsystems 22 and 23 are coupled together by a main system bus 25 configured to permit bi-directional exchanges of address, data and control signals therebetween. Certain components and/or devices forming part of the processor subsystem 22 (FIG. 2) handle exchanges between the originating station 12—coupled to the telecommunications network 10 via the originating switch 18—and either the terminating station 14—coupled to the telecommunications network 10 via the terminating switch 20—or another terminating station (not shown—coupled to the telecommunications network 10 via the IXC switch 16-N, another IXC switch (not shown) or the internet protocol (or "IP") network (also not shown). FIG. 1 shows the processor subsystem 22 as coupled to the originating switch 18, the terminating switch 20, the IXC switch 16-N, additional IXC switches and the IP network.

Also residing on the IXC switch 16-1 and coupled to the processor subsystem 22 is an IVR controlled provisioning/monitoring system 34. As will be more fully described below, the IVR provisioning/monitoring system 34 performs plural functions for the IXC switch 16-1, including the reprovisioning of the IXC switch 16-1 in response to a series of audibilized commands spoken by a switch administrator and the issuing of alerts and/or initiation of corrective action in response to the detection of pre-determined operating conditions. To reprovision the IXC switch 16-1, the IVR provisioning/monitoring system is shown coupled to the processor subsystem 22 which, as more fully described below, executes the code which provisions the IXC switch 16-1. To collect data needed to determine whether an alert should be issued or corrective action initiated, the IVR provisioning/monitoring system 34 is coupled to the HW and SW components 28 and 30 for receipt of data needed to determine whether an alert should be issued or corrective action initiated. As additional data needed to determine whether an alert should be issued or corrective action initiated is typically generated by call processing software executed by the processor subsystem 22, the IVR provisioning/monitoring system will also utilize the aforementioned coupling to the processor subsystem during monitoring operations as well.

Figure 2:
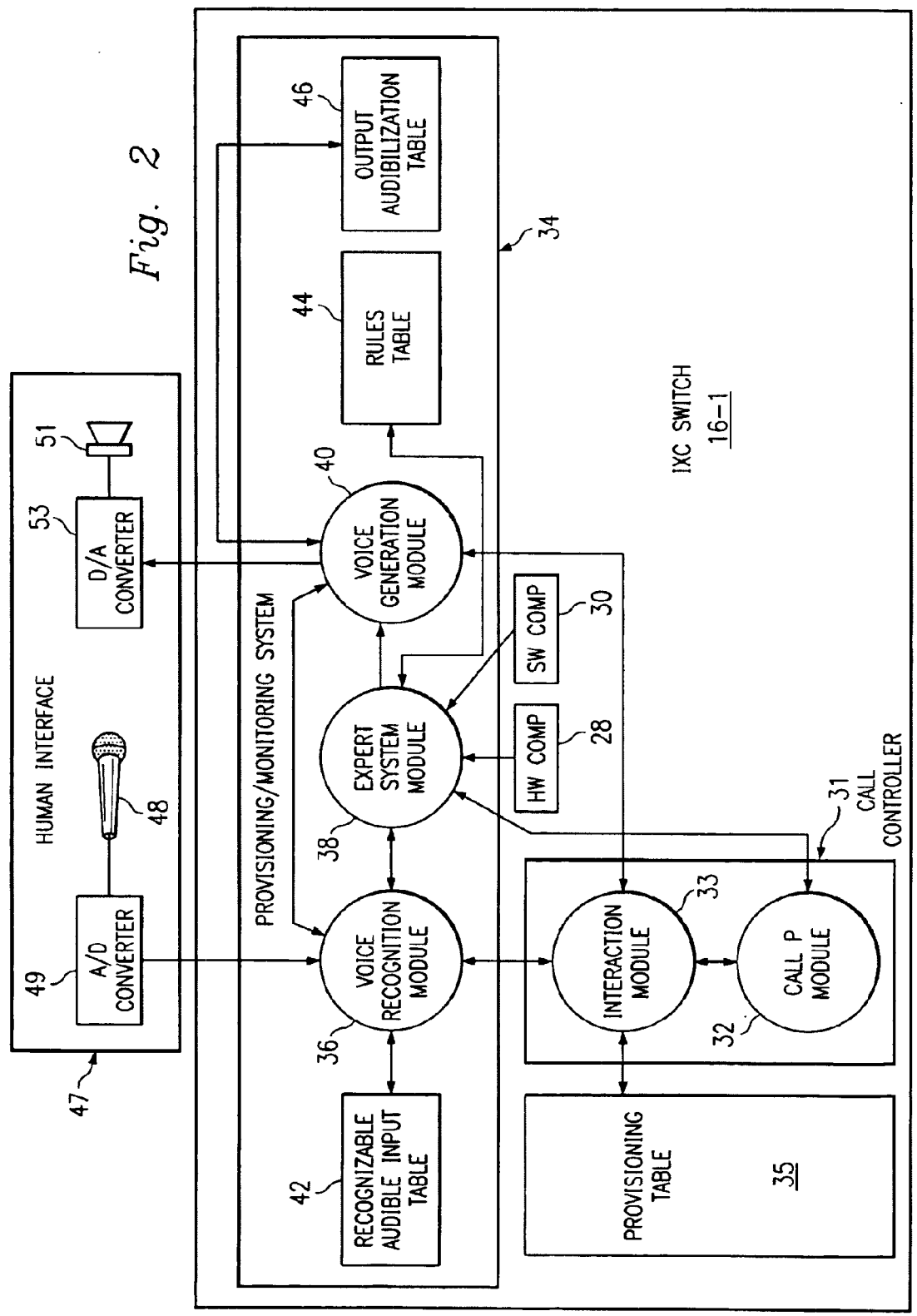
FIG. 2 is an expanded block diagram of the IVR provisioning/monitoring system of FIG. 1.

Referring next to FIG. 2, the role of the IXC switch 16-1 in handling exchanges between the originating and terminating stations 12 and 14 will now be described in greater detail. It should be understood that, in FIG. 2, the processor and memory subsystems 22 and 23 of which certain ones of the various components described herein form part thereof have been omitted for ease of illustration. It should be further understood that the terms "software module" and "application" are used interchangeably and are by no means intended to denote or otherwise imply different types of devices. Finally, it should be understood that the foregoing description of the invention as being comprised of plural software modules and/or applications is purely for ease of description of the various operations performed by the invention and is not intended to suggest or imply that a physical embodiment of the invention must be configured to include a series of discrete software modules and/or applications. Rather, it is fully contemplated that, in such a physical embodiment of the invention, plural ones of the software modules and/or applications may be embodied as respective portions or segments of code contained in a single software module or application.

As may now be seen, components forming part of the IXC switch 16-1 which have a role in handling exchanges between the originating and terminating stations 12 and 14 include a call controller 31 (typically, a hardware device forming part of the processor subsystem 22), a call processor (or "CALLP") application 32, an interaction application 33 and a provisioning table 35. The CALLP and interaction applications 32 and 33 are software modules which reside within the memory subsystem 23 and are executable by the call controller 31. The CALLP application 32 handles exchanges with the originating switch 18 and the terminating switch 20 when completing a connection between the originating station 12 and the terminating station 14. As will be more fully described below, the CALLP application 32 handles a call by interacting with an originating agent (or "OA") 24 residing at the originating switch 18 and a terminating agent (or "TA") 26 residing at the terminating switch 20.

While the CALLP application 32 handles the interactions with the OA 24 and the TA 26 necessary to handle an exchange between the originating and terminating stations 12 and 14, the interaction application 33 defines the interaction between the CALLP application 32 and the OA 24 and the TA 26 by: (1) selecting information maintained in the provisioning table 35 to define the interaction between the CALLP application 32 and the OA 24 and the TA 26 when handling exchanges therebetween; and (2) providing the selected information to the CALLP application 32 for use when handling exchange with the OA 24 and the TA 26. The provisioning table 35 is comprised of plural portions, each related to a different aspect of the interaction which occurs during call setup and routing. As disclosed herein, the provisioning table 35 is comprised of a resource provisioning portion, an interaction provisioning portion, a subscriber provisioning portion and a translations provisioning portion, each of which may correspond to a region, area, or other defined portion of the memory subsystem 31.

Broadly speaking, the IXC switch 16-1 is provisioned by storing, within the appropriate one of the provisioning portions, the information needed for the CALLP application 32 to handle interactions with the OA 24 and the TA 26. The information may be arranged in the form of a traditional database type of datafill or as a collection of discrete elements. The information stored in the resource provisioning portion provides trunk group, trunk group member and other resource information to the CALLS application 32. The interaction provisioning portion contains the information used to define the interaction between the CALLP application 32 and the OA 24 and the TA 26. The subscriber provisioning portion contains the information used to screen valid subscribers and to identify subscriber based features for calls. Finally, the translations provisioning portion contains the information related to various translation systems.

As previously mentioned, also residing within the IXC switch 16-1 is an IVR provisioning/monitoring system 34. The IVR provisioning/monitoring system 34 is comprised of one or more software modules 36, 38, 40 suitable for execution by a second processor subsystem (not shown) and one or more data tables 42, 44, 46 containing information maintained in respective areas of a second memory subsystem (also not shown). The processor subsystem executes the series of instructions forming the respective software modules 36, 38, 40 and, using data and/or instructions contained in the data tables 42, 44, 46, commands received from the switch administrator via human interface 47 and data received from the HW and SW components 28 and 30 (as well as the CALLP application 32) of the IXC switch 16-1, the IVR provisioning/monitoring system 34 performs plural functions for the IXC switch 16-1, including the reprovisioning of the IXC switch 16-1 in response to a series of audibilized commands spoken by the switch administrator and the issuing of alerts and/or initiation of corrective action in response to the detection of certain operating conditions previously determined to necessitate issuance of an alert or initiation of corrective action. As will be more fully described below, the provisioning/monitoring system 34 performs reprovisioning operations for the IXC switch 16-1 by generating reprovisioning commands in response to an IVR interchange with a switch administrator operating the human interface 47 and transmitting the generated reprovisioning commands to the interaction module 33 for execution. Thus, to perform reprovisioning operations, the voice recognition module 36 is further coupled to the interaction module 33. As a further part of the IVR interchange with the switch administrator, the provisioning/monitoring system 34 generates responses to audible commands received from the switch administrator. To generate responses, the voice generation module 40 is coupled to the interaction module 33 to receive reply messages, generated by the interaction module 33, in response to the commands issued thereto by the voice recognition module 36 and, using the received reply messages, generate responses for propagation to the switch administrator at the human interface 47. Preferably, the IVR provisioning/monitoring system 34 is a discrete device residing within the IXC switch 16-1 as shown in FIGS. 1 and 2. It is fully contemplated that, in an alternate embodiment of the invention, the software portion of the IVR provisioning/monitoring system 34 may, like the CALLP application 32, reside within the call controller 31 or another part of the processor subsystem 22 of the IXC switch 16-1. Similarly, the data tables 42, 44, 46 of the IVR provisioning/monitoring system 34 may reside within the memory subsystem 23 of the IXC switch 11. It is further fully contemplated that the IVR provisioning/monitoring system 34 may be remotely located relative to the IXC switch 16-1. For example, the UVR provisioning/monitoring system 34 may be located elsewhere in the telecommunications network 10 such as at a signal control point (or "SCP") (not shown).

Continuing to refer to FIG. 2, the UVR provisioning/monitoring system 34 will now be described in greater detail. More specifically, the IVR provisioning/monitoring system 34 is comprised of first, second and third software modules 36, 38 and 40 and first, second and third data tables 42, 44 and 46. The first software module 36 is a voice recognition module 36 which receives digitized versions of detected audibilizations and compares the detected audibilizations to recognizable audible commands stored in recognizable audible input table 42. Upon determination that an audible command has been received, the voice recognition module 36 transfers the received command to the interaction module 33 for execution thereof. The expert system module 38 collects data from the CALLP module 32, as well as HW and SW components 28 and 30, and, based upon a set of rules set forth within rules table 44, determines whether to issue an alert or other type of notification and/or initiate corrective action. If, based upon an examination of the data received from the CALLP module 32, the HW components 28 and the SW components 30 relative to the information maintained in the rules table 44, the expert system module 38 determines that an alert or other notification should be issued, the expert system module 38 notifies the voice generation module 40 of the notification or alert to be assembled for transmission to the human interface 47. The voice generation module 40 then generates an audible message which describes the alert or other notification that the expert system module 38 has instructed the voice generation module 40 to issue to the human interface 47. Using data maintained in the output audibilization table 46, the voice generation module 40 constructs an audible message for transmission to the human interface 47.

The switch administrator would access the IVR provisioning/monitoring system 34 via the human interface 47. As disclosed herein, the human interface 47 has an output line coupled to the voice recognition module 36 and an input line coupled to the voice generation module 40. Of course, in many IVR systems, the voice recognition module 36 and the voice generation module 40 have been combined into an integrated voice recognition/generation module. In use, audible sounds would be detected by audio input device 48, for example, a microphone, and propagated to A/D converter 49. There, the A/D converter 49 would convert the detected audible sound from an analog signal to a digital signal. The resultant digitized signal is then transferred to the voice recognition module 36 for analysis and/or identification. Conversely, the voice generation module 30 selects digitized audio signals from the output audibilization table 46 for propagation to D/A converter 53 for conversion to an analog audio signal. The D/A converter 53 then transports the received analog audio signal to an audio output device 40, for example, a speaker. Of course, if desired, one or both of the A/D converter 36 and/or the D/A converter 53 may instead form part of the IVR provisioning/monitoring system 34.

Figure 3B:
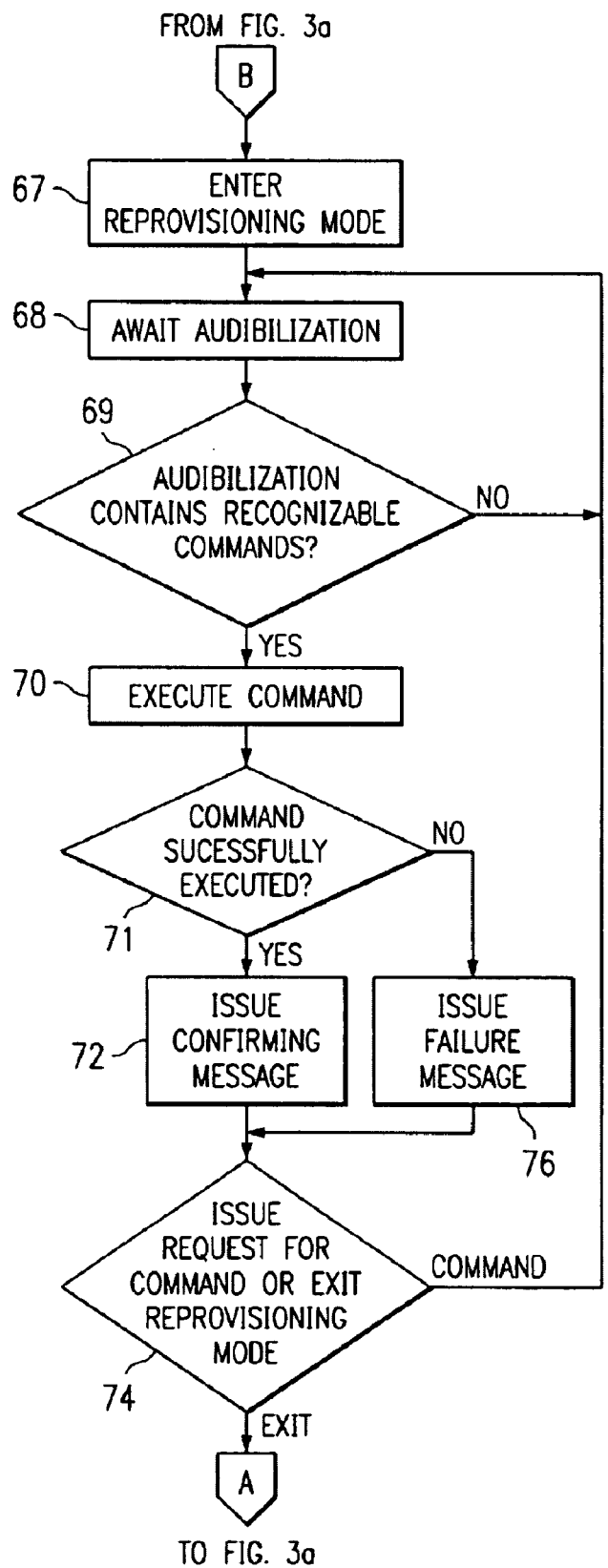
FIG. 3b is a flow chart of a method of reprovisioning the switching device of FIG. 1 using the IVR provisioning monitoring system of FIG. 2
Figure 3C:
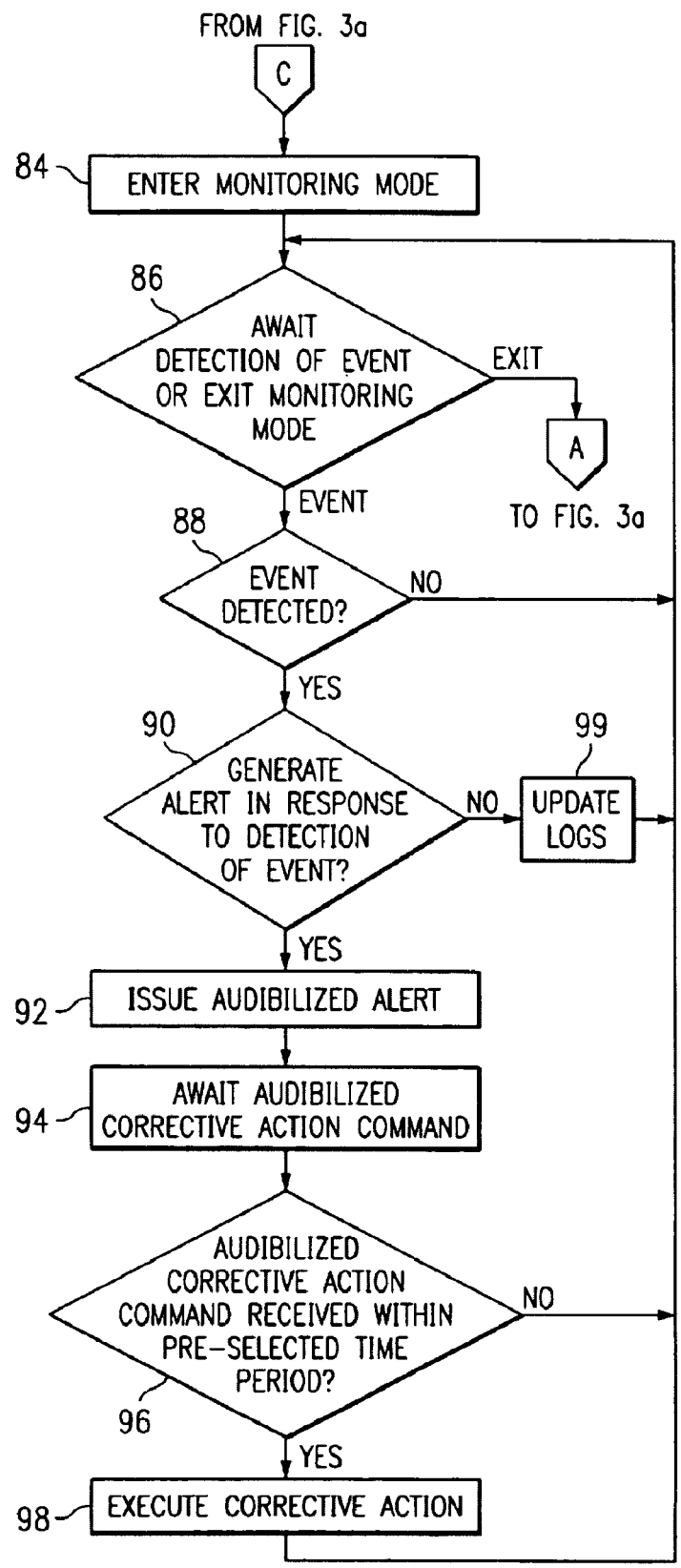
FIG. 3c is a flow chart of a method of monitoring the switching device of FIG. 1 using the IVR provisioning/monitoring system of FIG. 2.

Referring next to FIGS. 3a–c, a method of utilizing IVR techniques to interact with the IXC switch 16-1 to perform selected switching operations traditionally performed by a switch administrator using a keyboard or other data input device in combination with a video terminal or other data output device will now be described in greater detail. In the embodiment of the invention described herein, IVR techniques are used to perform two types of operations-switch reprovisioning and switch monitoring. It should be readily appreciated, however, that the disclosed techniques are readily extendable to other types of operations without departing from the scope of the present invention.

Turning first to FIG. 3a, the method commences at step 50 and, at step 52, the IXC switch 16-1 awaits an audibilized initiator. An audibilized initiator is a recognizable audibilized command used to initiate an audible IVR interaction between a switch administrator and an IXC switch. While awaiting an audibilized initiator, the IXC switch 16-1 may be in an IVR inactive mode in which it conducts normal switching operations but does not conduct IVR operations or, as will be more fully described below, may be conducting on-going IVR operations in an operating mode, for example, monitoring mode, previously selected by the switch administrator in accordance with the techniques set forth herein.

Whether the IXC switch 16-1 is in an IVR inactive mode or in IVR monitoring or other IVR mode of operations, the human interface 47 awaits an audibilized initiator by monitoring a specified area, for example, an area designated as the workspace of the switch administrator, for sound using the audio input device 48. All audible sound detected by the audio input device 48 are converted into a digital signal by the A/D converter 49 and transported to the IXC switch 16-1 for determination if the detected audible sound is an audibilized initiator. To do so, the voice recognition module 36 compares the received digitized audible sound to the digitized audibilized initiators stored in the recognizable audible input table 42. If the digitized audible sound matches one of the audibilized initiators stored in the recognizable audible input table 42, the method proceeds to step 54 where the IVR provisioning/monitoring system 34 determines that an audibilized initiator has been received and then on to step 56 where the IVR provisioning/monitoring system 34 issues a request for an authorization code. If, however, the voice recognition module 36 fails to match the detected audible sound to one of the audibilized initiators stored in the recognizable audible input table 42, a determination is made that no audibilized initiator has been received and the method continues to await an audibilized initiator at step 52.

Of course, it is contemplated that by digitizing all detected audible sounds for comparison to the audibilized initiators maintained in the recognizable audible input table 42 may consume an unnecessarily large amount of processing time, particularly if the audio input device 48 is located in an area characterized by a high level of background or other extraneous noise, it is fully contemplated that the audio input device 48 may be equipped with a level and/or pitch filter intended to filter out sound unlikely to be speech. The term "audibilization" shall be hereinafter used in place of the term "audible sounds" and is intended to refer to all audible sounds which are detected by the audible input device 48 and propagated to the IVR provisioning/monitoring system 34 for processing and all audible requests, instructions and/or notifications generated by the audible output device 51 as audible sounds.

Returning now to step 56, upon determining that an audibilized initiator has been received, the voice recognition module 36 issues a command to the voice generation module 40 instructing it to generate an audible request for an authorization code. To generate the audible request, the voice generation module reviews the output audibilization table 46 to identify the audible request corresponding to the instruction received from the voice generation module. Upon identifying the audible request corresponding to the received instruction, the voice generation module 40 retrieves the audible request from the output audibilization table 46 and transmits the audible request to the D/A converter 53, again in the form of a digital signal. There, the audible request is converted from a digital signal into an analog signal and propagated to the audio output device 51 where the analog signal is converted into an audibilization.

Upon issuing the audible request for an authorization code at step 56, the method proceeds to step 58 where the IVR provision/monitoring system 34 waits for an audibilization. If no audibilization is detected within a pre-selected time period, for example, 1 minute, after detection of an audibilized initiator, the method proceeds to step 78 where the voice recognition module 36 issues a command to the voice generation module 40 instructing the voice generation module 40 to issue a audibilization indicating that authorization to conduct IVR operations has been denied. As before, the voice generation module 40 locates an output audibilization stored in the output audibilization table 46 which corresponds to the received instruction. An audibilization is then generated in the same manner previously described with respect to the audibilized request described above. The method then returns' to step 52 to again await an audibilized initiator.

Returning to step 58, if an audibilization is detected within the pre-selected time period, the method proceeds to step 60 where the IVR provisioning/monitoring system 34 determines if the detected audibilization is an authorization code. As before, the voice recognition module 36 determines if the detected audibilization is an authorization code by comparing the received digitized audibilization to one or more authorization codes maintained in the recognizable audible input table 42. If it is determined by the voice recognition module 36 that the digitized audibilization does not contain an authorization code, the method proceeds to step 78 where the voice recognition module 36 again instructs the voice generation module 40 to issue an audibilization indicating that authorization to conduct IVR operations has been denied and then back to step 52 to again await an audibilized initiator.

If, however, it is determined at step 58 that the digitized audibilization matches one of the authorization codes stored in the recognizable audible input table 42, the method proceeds to step 62 where the voice recognition module 36 again initiates generation of an audibilization in the manner previously described. Here, however, the audibilization indicates that authorization to conduct IVR operations has been granted. Upon issuing such an audibilization, the method proceeds to step 64 where the voice recognition module again awaits an audibilization. Continuing on to step 65, if no audibilization is detected within a pre-selected time period, again, for example, one minute, the method proceeds to step 80 where active IVR operations are discontinued and then to step 52 to again await an audibilized initiator. If desired, the exit of the IXC switch 16-1 from the IVR active state may include the generation of an audibilization announcing the exit. Such an audibilization may be generated by the voice recognition module 36, in conjunction with the voice generation module 40, the output audibilization table 46, the D/A converter 53 and the audio output device 51 in the manner previously described. It is contemplated, by discontinuing active IVR operations, either with or without an accompanying audibilization, after a failure to detect an audibilization within a pre-selected time period, the risk of an unauthorized person initiating undesired IVR operations, for example, if the switch administrator inadvertently leaving their workspace while the IXC switch 16-1 is still in the IVR active state is reduced substantially.

Returning now to step 65, if an audibilization is detected within the preselected time period, the method proceeds to step 66 where the provisioning/monitoring system determines if the detected audibilization contains a command to enter a recognizable mode of operation, again by comparing the digitized version of the detected audibilization to the recognizable modes of operation stored in the recognizable audible input table 42. For example, "reprovisioning" and "monitoring" are two such modes of operation which will have such a command to enter that mode of operation stored in the recognizable audible input table 42. If, at step 66, the voice recognition module 36 matches the digitized audibilization to one of the commands to enter a mode of operation maintained in the recognizable audible input table 42, the IVR method enters that mode of operation. If, however, the digitized audibilization fails to match one of the recognizable commands to enter a specified mode of operation maintained in the recognizable audible input table 42, the method returns to step 64 to await a next audibilization 110 which, if detected, will be compared to the recognizable modes of operation. As before, either the successful entry into a particular mode of operation and/or the failure to do so may be accompanied by the generation, by the IVR provisioning/monitoring system 34 of an audibilization indicating the successful and/or unsuccessful entry into a mode of operation. Any such audibilization may be generated in the manner previously described.

Momentarily returning to step 66 of FIG. 3*a*, if the audibilization contains a command to enter the reprovisioning mode of operation, the method proceeds to step 67 of FIG. 3*b* where the IXC switch 16-1 enters the reprovisioning mode of operation and on to step 68 where the IVR provisioning/monitoring system 34 of the IXC switch 16-1 awaits a next audibilization. Conversely, if the audibilization contains a command to enter the monitoring mode of operation, the method proceeds to step 84 (FIG. 3*c*) where the IVR provisioning/monitoring system 34 enters the monitoring mode of operation. Of course, if the IVR provisioning monitoring system 34 has been configured to conduct other types of operations using IVR, the IXC switch 16-1 could instead initiate IVR operations of another undisclosed type if the detected audibilization contains a command to enter that mode of IVR operations and the recognizable audible input table 42 maintains the command as a recognizable command to enter a specified mode of operations.

Turning now to FIG. 3*b*, the method of IVR reprovisioning of the IXC switch 16-1 will now be described in greater detail. As previously set forth) upon entering the reprovisioning mode at step 67, the method proceeds to step 68 to await a next audibilization. Upon detecting an audibilization, the method continues on to step 69 where the voice recognition module 36, after digitization and propagation of the digitized audibilization to the voice recognition module 36 in the manner previously described, reviews the contents of the recognizable audible input table 42 to determine if the detected audibilization contains a recognizable reprovisioning command. If the detected audibilization does not contain a recognizable reprovisioning command, no switch reprovisioning operations are conducted and the method returns to step 68 to await another audibilization. If desired, a timeout operation similar to that previously described may be incorporated into step 68. For example, step 68 may be alternately configured such that, if an audibilization is not detected within a pre-selected time period, again, for example, one minute, the method will automatically exit the reprovisioning mode and go to step 78 of FIG. 3*a* and proceed in the manner more fully described below.

If, however, it is determined at step 69 that the detected audibilization contains a recognizable reprovisioning command, the method proceeds to step 70 where the voice recognition module propagates the received reprovisioning command to the interaction module 33 which reprovisions the IXC switch 16-1 in accordance with the received command. For example, during a typically reprovisioning operation, the contents of the provisioning table 35 is modified such that, when the interaction module 33 provides provisioning information to the CALLP application 32, the revised provisioning information is used in place of the original reprovisioning information. At step 71, the method checks to see if the received reprovisioning command has been successfully executed. If the interaction module 33 determines that the reprovisioning command has been successfully executed, the method proceeds to step 72 for issuance of a confirming message to the switch administrator. For example, if the reprovisioning command involved a rewrite of the contents of a specified register maintained by the provisioning table 35 with a new value, the interaction module 33 will determine that the reprovisioning command has been successfully executed when the contents of the specified register has been rewritten. If, however, the reprovisioning command was unsuccessfully executed, for example, the rewrite of the specified register failed due to a write error, the method will instead proceed to step 76 where the interaction module issues a failure message. Generation of either a confirming message at step 72 or a failure message at step 76 is performed in the manner previously described, specifically, the confirming or failure message received from the interaction module is compared to the contents of the output audibilization table 46 to identify an audibilization which corresponds to the received message. The voice generation module 40 transmits the corresponding digitized audibilization to the D/A converter 53 for conversion into an analog audibilization signal and on to the output audio device 51 where the analog audibilization signal is used to generate audible sound.

Upon generation of a confirming message at step 72 or generation of a failure message at step 76, the method proceeds to step 74 where the provisioning/monitoring system 34 may either issue a request for another command or exit the reprovisioning mode. If awaiting a next command, the method returns to step 68 to again await a next detected audibilization. If exiting the reprovisioning mode, the method instead proceeds to step 78 of FIG. 3*a* and proceeds in the manner described below. It is contemplated that step 74 may be accomplished using a variety of IVR dialogues. For example, using the techniques disclosed herein, the voice generation module 40 may generate a request for command and await a next audibilization. If the voice recognition module 36 recognizes the next audibilization as an affirmative answer to the request, the method will proceed to step 68. If, however, the voice recognition module 36 recognizes the next audibilization as a negative answer to the request, the voice generation module may then generate an inquiry as to whether exiting the reprovisioning mode is desired and then await a next audibilization. If the next audibilization is an affirmative answer to the inquiry, the method will again proceed to step 78 of FIG. 3*a*. If, however, the next audibilization is a negative answer to the inquiry, the voice generation module may again issue a request for command. Of course, it may be desirable to further configure step 74 to include an automatic exit of the reprovisioning mode if plural requests for command are answered in the negative or, to treat a failure to detect an audibilization within a pre-selected time period as either a negative reply to a request for command and/or an affirmative request to exit the reprovisioning mode. Finally, the exit from the reprovisioning mode may also include generation of a notification, by the voice generation module, of the exit from the reprovisioning mode. Any such notification would be generated in the manner previously described herein.

Returning briefly to step 66 of FIG. 3a, if the recognizable mode of operation contained in the audibilization detected at steps 65 and recognized at step 66 is the monitoring mode, the method would instead proceed to step 84 of FIG. 3c and enter the monitoring mode. In the monitoring mode, the expert system module 38 would assume control of the method from the joint control of the voice recognition module 36 (when awaiting and/or processing detected audibilizations) and the voice generation module 40 (when analyzing response and/or generating audibilizations). As the voice recognition module is awaiting an audibilization at the point of entry into the monitoring mode, notification of the expert system module 38 would most likely be performed by the voice recognition module 36. Of course, while, in the embodiment of the invention disclosed herein, it is contemplated that the reprovisioning and monitoring modes run exclusively of one another, it is fully contemplated that the two modes may run concurrently. Of course, concurrent operations would require some arbitration techniques, for example, within the voice generation module 40 to determine priority between competing resources, for example, in the event the voice recognition module 36 and the expert system module 38 attempt to concurrently generate audibilizations.

Upon entry of the monitoring mode at step 84, the method proceeds to step 86 to await detection of an event or an exit of the monitoring mode. To exit the monitoring mode, the voice recognition module 36 would be instructed by the expert system module 38 to await detection of an audibilization and determine if the detected audibilizations corresponds to a command, maintained in the recognizable audible input table 42, to exit the monitoring mode. If audibilization of such a command is detected by the voice recognition module 36, the voice recognition module 36 advises the expert system module 38 of the detection of the command. The expert system module 38 would then return control of the method to the voice recognition module 36 and/or the voice generation module 40 and the method would proceed to step 78 of FIG. 3a as described below. Generally, awaiting detection of an event or detection of an audibiization of a command to exit the monitoring mode should run, concurrently.

It is contemplated that a wide variety of techniques may be used to monitor and detect an event occurring within the switch. As disclosed herein, the term "event" refers to the occurrence of an operating condition previously determined as necessitating transmission of data to the expert system module 38 for analysis. Events may be defined differently for various devices depending on the sophistication thereof. For example, a relatively simple hardware device such as a temperature monitor may determine an event as the monitored temperature after expiration of a selected time period. Sophisticated hardware devices, on the other hand, may be configured such that an event is defined as an operating condition or change in the operating condition outside of a specified parameter. For example, a temperature above 30 degrees Centigrade or a rate of temperature change exceeding more than 5 degrees per hour may indicate the occurrence of an event.

In variously configured systems, event monitoring and detection processes may be configured as passive or active processes. Generally, a passive process for monitoring and detecting events involves the hardware device and/or software module being monitored initiating a transmission of data to the expert system module 38. For example, in the embodiment of the invention disclosed herein, one or more of the HW components 28, one or more of the SW components 30 and the CALLP application 32 are coupled to the expert system module 38 for the transmission of data thereto. More specifically, while provisioning or reprovisioning the IXC switch 16-1, the HW component 28, the SW component 30 and the CALLP application 32 are configured to report selected operational characteristics to the expert system module. For example, if the HW component 28 is a disk drive, the HW component may be instructed to advise the expert system module of each write operation conducted and whether the operation was successful. Also by way of example, if the SW component 30 was an application that periodically calculated the load factor for the IXC switch 16, the SW component 30 may be instructed to report each calculated load factor to the expert system module 38. Conversely, if the expert system module 38 was instead configured as an active event monitoring and detection system, the expert system module 38 would include a series of instructions which would periodically poll various devices and/or applications within the IXC switch 16-1, for example, the HW component 28, the SW component 30 and/or the CALLP application 32, for selected operational characteristics. The expert system module 38 would then analyze the polled data acquired by active monitoring in a manner similar to the analysis of the passively acquired data described herein.

Proceeding on to step 90, upon receipt of a notification of an event by the expert system module 38, the method then determines the appropriate response to the event. In the embodiment of the invention disclosed herein, it is contemplated that the response to a receipt of a notification of the occurrence of an event, the expert system module 38 determines whether to proceed to step 92 to issue an alert or may proceed to step 99 where, rather than generating an audible alert, the event is merely entered in one of the logs maintained by the expert system module 38. Of course, it should be readily appreciated that a wide variety of responses or combinations thereof may be initiated by the expert system module 38 in response to receipt of a notification of the occurrence of an event. For example, one such response may be the initiation of corrective action by the expert system module 38 generating commands for transmission to various ones of the HW component 28, the SW component 30 and the CALLP module 32.

As should be further appreciated, the expert system module 38 may determine whether to issue an alert using a wide variety of techniques. For example, in the embodiment of the invention disclosed herein, it is contemplated that the expert system module 38 be a rules-based system. In such a system, a set of rules are maintained in the rules table 44. Upon the occurrence of an event, the expert system module 38 checks the rules table to determine a result which corresponds to the received event. A highly simplified example of a rule may be "issue an alert to the human interface 47 if the load factor for the IXC switch 16-1 exceeds 0.38." For this example, the CALLP application 32 would periodically provide the expert system module 38 with the load factor for the IXC switch 16-1. In turn, the expert system module 38 would then determine if the event, here, the receipt of a load factor for the switch being monitored, would check the rules table 44 for a rule associated with the received event. After retrieving the associated rule, the expert system module 38 would then generate an alert if the received load factor exceeded 0.38 but would merely log the load factor if it was below 0.38.

If, after consulting the rules table 44, the expert system module 38 determines that an update to one or more logs at step 99 is the appropriate response, event handling is completed and the method returns to step 86 to await detection of a next event or a command to exit the monitoring mode. If, however, the expert system module 38 determines that the issuance of an alert at step 92 is the appropriate response to the monitored event, an audibilized alert is generated at step 94 by the expert system module generating an alert command, typically, by identifying alert type associated with the rule from the rules table resulting in issuance of the alert and transmitting the alert type to the voice generation module 40. In turn the voice generation module 40 would check the output audibilization table 46 for an audibilized message associated with the alert type received from the expert system module 38. The voice generation module 40 would then transmit the digitized audibilized message to the human interface 47 where the message is used to generate audible sound in the manner previously described.

Rather than the rules-based expert system module 38 disclosed herein, in an alternate embodiment of the invention, the expert system module 38 may be be embodied as a fuzzy logic-based expert system module. While fuzzy logic-based systems are often variously configured, many such systems use a weighting system to determine whether or not a particular result should, be reached. For example, if the fuzzy logic-based system has several different possible actions which may be initiated in response to one or more events, each event may be associated with a different weight for each possible action. Once a particular action rises to a certain weight, the fuzzy-logic based system will execute the action as the most likely correct response to the occurrence of an event or series of events. As before, the action initiated by a fuzzy logic-based system may be the action of step 92 (issuance of an audibilized alert), the action of step 99 (an update of one or more logs) or another action not set forth herein.

Returning now to step 96, after issuance of an audibilized alert, the method proceeds to step 94 to await a next audibilization, specifically, an audibilized command, issued by the switch administrator, to initiate corrective action. If no audibilization is detected within a pre-selected time period, again, for example, one minute, no corrective action is taken at step 94 in response to the generated alert. The method will then return to step 86 to await a next detection of an event or exit the monitoring mode in the manner previously described. If however, an audibilization is detected at step 96, the method proceeds to step 98 where the corrective action is executed. Having taken corrective action in response to the audibilized alert, the method then returns to step 86 to await a next event or exit the monitoring mode. Of course, execution of the corrective action may be performed in various manners. For example, if the corrective action requires reprovisioning of the IXC switch 16-1, the method may return to step 69 of FIG. 3*b* to await an audibilization containing one or more recognizable commands. Alternately the method may return as far back as step 54 of FIG. 3*a* to await an audibilized initiator. Or the method may return to another point within the disclosed process.

Finally, upon exit of the reprovisioning mode at step 74 of FIG. 3*b* or upon exit of the monitoring mode at step 86 of FIG. 3*c*, the method then proceeds to step 78 of FIG. 3*a* where the voice generation module 40 issues a request for a command to enter a next mode of operation or to enter IVR inactive mode. If the next detected audibilization is a recognizable mode of operation, from step 78, the method returns to step 64 and then proceeds through steps 65 and 66 to enter the next mode of operation. If, however, no audibilization is detected within a pre-selected time period, for example, one minute, after issuance of the request for a next mode of operation or if the next detected audibilization is a recognizable command to enter IVR inactive mode, the method returns to step 52 to await a next audibilized initiator.

One exemplary IVR interactive dialogue in accordance with the disclosed techniques is set forth below.

| | |
|---|---|
| ADMINISTRATOR: | "Good morning Switch." (Steps 52, 54) |
| IXC SWITCH: | "Good morning. May I have your ID number?" (step 56) |
| ADMINISTRATOR: | "021506." (steps 58, 60) |
| IXC SWITCH: | "Hello Barry. What can I do for you today?" (step 62) |
| ADMINISTRATOR: | "Add 20% more traffic capacity between yourself and the Plano office." (steps 66 and 69) |
| IXC SWITCH: | "Barry, I have added 16 new trunk members to trunk group RichPlano01. Those member numbers are 166 through 182 Will that be all?" (steps 72 and 74) |
| ADMINISTRATOR: | "Yes, for now. Go in monitoring mode" (steps 74 and 66) |

The foregoing IVR interaction involves the reprovisioning of the IXC switch 16-1 to increase capacity between two offices, for example, the IXC switch 16-1 and the IXC switch 16-N. To perform such a reprovisioning, four trunk tables-CLLI, TRKGRP, TRKMEM and C7TRKMEM must be consulted and/or modified. Of these, the CLLI table provides the stated capacity of each trunk group, the TRKGRP table identifies the existing trunk groups, the TRKMEM table identifies the physical trunks in the group and the C7TRKMEM assigns a CIC number to the trunk member number. Thus, to perform the desired IVR interaction, the recognizable audible input table 42 must include sufficient recognizable audible inputs and associated commands to access and/or modify each of these tables which, as previously set forth, form respective parts of the provisioning table 35, in the described manner.

It should be noted that the exemplary IVR interaction has a level of sophistication above that disclosed with respect to FIGS. 3*a*–*c*. Such an interaction is readily achieved by use of advanced IVR techniques which enables the voice recognition module to decipher natural speech and to identify and execute multiple commands, including a series of sequential commands, contained in a single audibilized sentence. For example, the audibilization "Add 20% more traffic capacity between yourself and the Plano office." contains plural commands combined into natural language and would only be properly interpreted by sophisticated IVR systems.

It should also be noted that the specific configuration of the recognizable audible input table 42 and/or the output audibilization table 46 may vary in alternate embodiments of the invention. For example, the recognizable audible input table may contain all recognizable audibilizations and associated commands in a common space to be searched by the voice recognition module upon receipt of a digitized audibilization. Alternately, the recognizable audible input table 42 may be segmented into plural sections, for example, for recognizable initiators, authorization codes, modes of operations and recognizable commands for each possible mode of operation. In this embodiment, the voice recognition module would, depending on the type of audibilization expected, search a particular section of the recognizable audible input table 42. Such a configuration is, however, not recommended for use in a sophisticated natural language level IVR system intended to execute plural commands, often of different types, in response to a single natural language audibilization.

Figure 4:
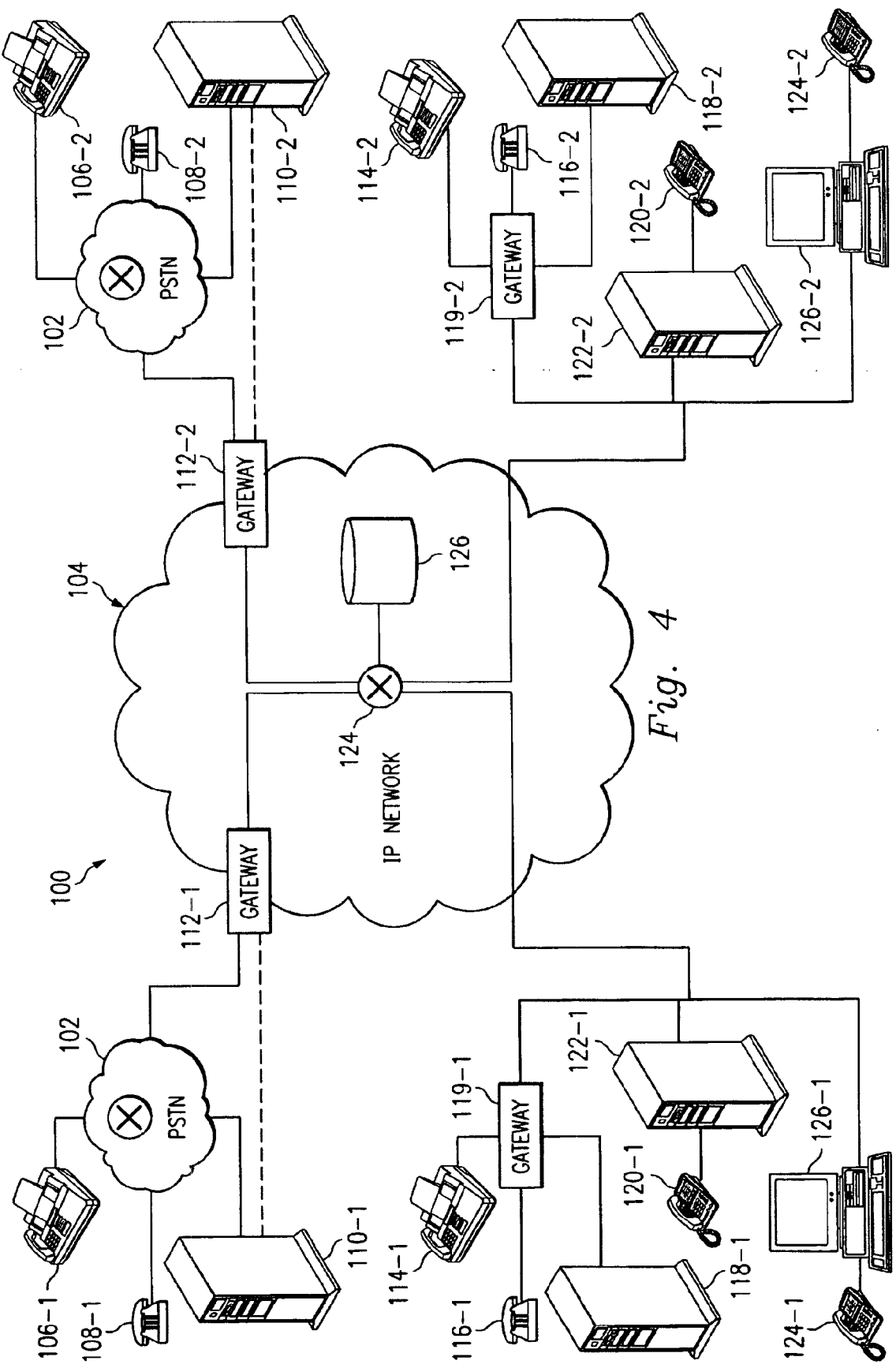
FIG. 4 is a block diagram of an IP network which includes a network level IVR provisioning/monitoring system similarly configured to the switching device level IVR provisioning/monitoring system of FIG. 2.

Referring next to FIG. 4, a network level IVR provisioning/monitoring system similarly configured to the switching device level IVR provisioning/monitoring system of FIG. 2 will now be described in greater detail. As disclosed herein, the originating and/or destination terminals may include voice terminals 108-1, 108-2, facsimile machines 106-1, 106-2 and data terminals 110-1, 110-2, all of which are coupled to IP network 104 via PSTN 102 and gateways 112-1, 112-2. Other voice and facsimile terminals 114-1, 114-2, 116-1, 116-2 are directly coupled to the IP network 104 via a gateway 119-1, 119-2. Private branch exchanges (or "PBXs"), here representatively illustrated by PBX 118-1, 118-2 are also directly coupled to the IP network 104 via the gateways 119-1, 119-2, but typically include plural voice, facsimile and data terminals (not shown in FIG. 4) coupled to the PBX 118-1, 118-2. Finally, IP terminals such as IP voice terminals 124-1, 124-2 and associated IP data terminals 126-1, 126-2 and IP protocol PBXs 122-1, 122-2 and any terminals, for example, voice terminals 120-1, 120-2 coupled thereto) are all directly coupled to the IP network 104.

Regardless of the particular configuration of the IP network 104 and/or the various voice, facsimile and data terminals 106-1 through 126-2 coupled thereto, similar to the IXC switch 16-1 of the telecommunications network 10 of FIG. 1, the IP network 104 of FIG. 4 includes a router 124 which functions as the call controller node for the IP network 104 to couple the various terminals for exchanges of messages therebetween. Network level functionality resides within a data node 126, typically a storage facility which maintains network level services for the IP network 104. The aforementioned IVR provisioning and monitoring techniques may be executed by an authorized administrator at a terminal coupled to the IP network 104, for example, to reprovision the router 124, by a similar IVR exchange between that terminal and the provisioning/monitoring system which, in this embodiment of the invention, resides within the data node 126.

Although illustrative embodiments of the invention have been shown and described, other modifications, changes, and substitutions are intended n the foregoing disclosure. Accordingly, it is appropriate that the appended claims be construed broadly and in a manner consistent with the scope of the invention.

What is claimed is:

1. A switch for a telecommunications network, said switch comprising:
  a call processing application, said call processing application handling interactions with originating and terminating agents in accordance with an interaction framework;
  a switch reprovisioning system coupled to said call processing application, said switch reprovisioning system reprovisioning said call processing application for said interactions with said originating and terminating agents;
  a user interface coupled to said switch reprovisioning system, said user interface configured for receiving voice commands, issued by a switch administrator, for transmission to said switch reprovisioning system and generating audibilized responses, issued by said switch reprovisioning system, for transmission to said switch administrator; and
  a recognizable audible input table coupled to said switch reprovisioning system and said user interface, said recognizable audible input table maintaining a plurality of recognizable reprovisioning instructions suitable for use by said switch reprovisioning system to modify said interaction framework used by said call processing application.

2. The switch of claim 1 wherein said switch further comprises:
  an interaction application coupled to said switch reprovisioning system and said call processing application, said interaction application constructing said interaction framework for said call processing application; and
  at least one provisioning table which contains a plurality of provisioning instructions suitable for use by said call processing application;
  said interaction application receiving at least one voice command from said user interface and reprovisioning said switch by modifying, using selected ones of said plurality of instructions maintained in said provisioning table, said interaction framework for said call processing application.

3. A switch for a telecommunications network, said switch comprising:
  a call processing application, said call processing application handling interactions with originating and terminating agents in accordance with an interaction framework;
  a switch reprovisioning system coupled to said call processing application, said switch reprovisioning system reprovisioning said call processing application for said interactions with said originating and terminating agents;
  a user interface coupled to said switch reprovisioning system, said user interface configured for receiving voice commands, issued by a switch administrator, for transmission to said switch reprovisioning system and generating audibilized responses, issued by said switch reprovisioning system, for transmission to said switch administrator;
  at least one provisioning table which contains a plurality of provisioning instructions suitable for use by said call processing application;
  an interaction application coupled to said switch reprovisioning system and said call processing application, said interaction application constructing said interaction framework for said call processing application, said interaction application receiving at least one voice command from said user interface and reprovisioning said switch by modifying, using selected ones of said plurality of instructions maintained in said provisioning table, said interaction framework for said call processing application;
  a voice recognition application coupled between said user interface and said interaction application; and
  a recognizable audible input table coupled to said voice recognition application, said recognizable audible input table maintaining a plurality of recognizable provisioning instructions suitable for use, by said interaction module, to modify said interaction framework used by said call processing application;
  wherein said voice recognition application is configured for detecting audible sounds, determining if said detected audible sounds corresponds to any of said recognizable instructions maintained in said recognizable audible input table and issuing, to said interaction application, said recognizable provisioning instructions corresponding to said detected audible sounds; and wherein said interaction application reprovisions said switch by modifying said interaction framework using said issued provisioning instructions.

4. The switch of claim 3 wherein said provisioning instructions maintained in said recognizable audible input table includes resource provisioning information for use in modifying interactions between said switch and originating agents.

5. The switch of claim 3 wherein said provisioning instructions maintained in said recognizable audible input table includes interaction provisioning information for use in modifying interactions between said switch and originating agents for collecting information related to call set-up and call routing.

6. The switch of claim 3 wherein said provisioning instructions maintained in said recognizable audible input table includes subscriber provisioning information for use in modifying interactions between said switch and originating agents for collecting information related to subscriber authorization.

7. The switch of claim 3 wherein said provisioning instructions maintained in said recognizable audible input table includes translations provisioning information for use in modifying interactions between said switch and said terminating agents.

8. The switch of claim 3 wherein said reprovisioning system further comprises:

a voice generation application coupled between said user interface and said voice recognition application; and an output audibilization table coupled to said voice generation application, said output audibilization table maintaining a plurality of audibilizations for use, by said voice generation application, to generate audible messages for transmission to said user interface in response to receipt of replies issued by said interaction module in response to said provisioning instructions issued by said voice recognition application.

9. The switch of claim 8 herein said user interface further comprises:

an audio input device for detecting audible sounds;

an A/D converter having an input coupled to said audio input device and an output coupled to said voice recognition application, said A/D converter converting audible sounds received from said audio input device into digitized signals for transmission to said voice recognition application;

an audio output device for generating audible sounds; and a D/A converter having an input coupled to said voice generation application and an output coupled to said audio output device, said D/A converter converting digitized signals received from said voice generation application into audible sounds for transmission to said audio output device.

10. A switch for a telecommunications network, said switch comprising:

at least one hardware-based component;

at least one software-based component;

a switch monitoring system coupled to each of said at least one hardware-based component of said switch and to each one of said at least one software-based component of said switch, said switch monitoring system receiving operational information from said at least one hardware-based component and said at least one software-based component and issuing, based upon said received operational information, a selected one of a plurality of instructions, at least one of said plurality of instructions being an instruction to issue a specified audible notification;

an expert system application coupled to each of said at least one hardware-based switch component and said at least one software-based switch component, said expert system application adapted for receiving operational information from said at least one hardware-based component and said at least one software-based component, issuing, based upon said received operational information, a selected one of a plurality of instructions;

a voice generation application coupled to said switch monitoring system, said voice generation application receiving said selected instruction from said switch monitoring system if said selected instruction is an instruction to issue an audible notification, generating a digitized message corresponding to said audible notification; and a user interface coupled to said voice generation application, said user interface configured for receiving said digitized message issued by said voice generation application and converting said received digitized message into audible sound.

11. A switch for a telecommunications network, said switch comprising:

at least one hardware-based component;

at least one software-based component;

a switch monitoring system coupled to each of said at least one hardware-based component of said switch and to each one of said at least one software-based component of said switch, said switch monitoring system receiving operational information from said at least one hardware-based component and said at least one software-based component and issuing, based upon said received operational information, a selected one of a plurality of instructions, at least one of said plurality of instructions being an instruction to issue a specified audible notification;

an expert system application coupled to each one of said at least one hardware-based switch component and said at least one software-based switch component; and a rules table coupled to said expert system application, said rules table containing information governing operation of said switch;

said expert system application adapted for receiving operational information from said at least one hardware-based component and said at least one software-based component, issuing, based upon said received operational information and said information contained in said rules table, said selected one of said plurality of instructions.

12. A switch for a telecommunications network, said switch comprising:

at least one hardware-based component;

at least one software-based component;

a switch monitoring system coupled to each of said at least one hardware-based component of said switch and to each one of said at least one software-based component of said switch, said switch monitoring system receiving operational information from said at least one hardware-based component and said at least one software-based component and issuing, based upon said received operational information, a selected one of a plurality of instructions, at least one of said plurality of instructions being an instruction to issue a specified audible notification;

an expert system application coupled to each one of said at least one hardware-based switch component and said at least one software-based switch component; and a rules table coupled to said expert system application, said rules table containing information governing operation of said switch, said rules table contains a plurality of operating conditions, at least one instruction associated with each operating condition and a numerical value assigned thereto;

said expert system application receiving operational information from said at least one hardware-based component and said at least one software-based component, employing fuzzy logic to rank said at least one instruction contained in said rules table, and initiating a highest ranked one of said at least one instruction.

13. A switch for a telecommunications network, said switch comprising:

at least one hardware-based component:

at least one software-based component:

a switch monitoring system coupled to each of said at least one hardware-based component of said switch and to each one of said at least one software-based component of said switch, said switch monitoring system receiving operational information from said at least one hardware-based component and said at least one software-based component and issuing, based upon said received operational information, a selected one of a plurality of instructions, at least one of said plurality of instructions being an instruction to issue a specified audible notification;

an expert system application coupled to each one of said at least one hardware-based switch component and said at least one software-based switch component; and a rules table coupled to said expert system application, said rules table containing a set of rules governing operation of said switch, each one of said set of rules comprised of a first portion containing an operating condition for said switch and a second portion containing an instruction to be taken if said operating condition contained in said first portion is met;

said expert system application receiving operational information from said at least one hardware-based component and said at least one software-based component, and issuing, based upon said received operational information and said information contained in said rules table, said selected one of said plurality of instructions.

14. The switch of claim 13 wherein said switch monitoring system further comprises:

an output audibilization table coupled to said voice generation application, said output audibilization table maintaining a plurality of digitized messages, each corresponding to one of said instructions to issue an audible notification, for use, by said expert system, to generate audible messages for transmission to said user interface.

15. The switch of claim 14 wherein said user interface further comprises:

an audio output device for receive analog signals and generating audible sounds therefrom; and a D/A converter having an input coupled to said voice generation application and an output coupled to said audio output device, said D/A converter converting digitized signals received from said voice generation application into analog signals for transmission to said audio output device.

16. The switch of claim 13 and further comprising:

a call processing application, said call processing application handling interactions with originating and terminating agents in accordance with an interaction framework;

an interaction application coupled to said call processing application, said interaction application constructing said interaction framework for said call processing application; and at least one provisioning table coupled to said call processing application, each of said at least one provisioning table containing a plurality of instructions suitable for use by said call processing application;

said interaction application modifying, using selected ones of said plurality of instructions maintained in said provisioning table, said interaction framework for said call processing application.

17. The switch of claim 16 and further wherein the switch monitoring system further is a combination switch provisioning/monitoring system, said combination switch provisioning/monitoring system further comprising:

a provisioning system coupled to said call processing application, said provisioning system provisioning said call processing application for said interactions with said originating and terminating agents;

said human interface configured for receiving voice commands, issued by a switch administrator, for transmission to said provisioning system and transmitting responses, issued by said provisioning system, for transmission to said switch administrator;

a voice recognition application coupled between said human interface and said interaction application; and a recognizable audible input table coupled to said voice recognition application, said recognizable audible input table maintaining a plurality of recognizable instructions suitable for use, by said interaction module, to modify said interaction framework used by said call processing application;

said voice recognition application configuring for detecting audible sounds, determining if said detected audible sounds corresponds to any of said recognizable instructions maintained in said recognizable audible input table and issuing, to said interaction application, said recognizable instructions corresponding to said detected audible sounds;

said interaction application modifying said interaction framework using said issued instructions.

18. The switch of claim 17 wherein said provisioning system further comprises:

a voice generation application coupled between said human interface and said interaction application; and an output audibilization table coupled to said voice generation application, said output audibilization table maintaining a plurality of audibilizations for use, by said interaction application, to generate audible messages for transmission to said human interface.

19. The switch of claim 18 wherein said voice generation application is also coupled to said voice recognition module, said output audibilization table further maintaining a plurality of audibilizations for use, by said voice recognition application, to generate audible messages to said human interface.

20. The switch of claim 19 wherein said human interface further comprises:
   an audio input device for detecting audible sounds;
   an A/D converter having an input coupled to said audio input device and an output coupled to said voice recognition module, said A/D converter converting audible sounds received from said audio input device into digitized signals for transmission to said voice recognition module;
   an audio output device for generating audible sounds; and
   a D/A converter having an input coupled to said voice generation module and an output coupled to said audio output device, said D/A converter converting digitized signals received from said voice generation module into audible sounds for transmission to said audio output device.

21. A method for reprovisioning a switch, comprising the steps of:
   detecting an audible sound;
   determining if said audible sound is an audibilized command containing a reprovisioning instruction by comparing said audible sound to a recognizable audible input table maintaining a plurality of recognizable reprovisioning instructions; and
   if said audible sound is an audibilized command containing a reprovisioning instruction found in said recognizable audible input table, reprovisioning said switch in accordance with said reprovisioning instruction.

22. The method of claim 21 wherein the step of determining if said audible sound is an audibilized command containing a reprovisioning instruction further comprises the steps of:
   digitizing said audible sound;
   comparing said digitized audible sound with a plurality of recognizable commands;
   if said digitized audible sound matches one of said recognizable commands, executing a reprovisioning instruction contained in said digitized audible sound.

23. A method for reprovisioning a switch, comprising the steps of:
   detecting a first audible sound;
   upon detecting said first audible sound, issuing a request for an authorization code;
   detecting a second audible sound;
   determining if said second audible sound is said requested authorization code;
   if said second audible sound is said requested authorization code, detecting a third audible sound;
   digitizing said third audible sound;
   comparing said digitized third audible sound with a plurality of recognizable commands:
   if said digitized third audible sound matches one of said recognizable commands, executing the reprovisioning instructions contained in said digitized third audible sound.

* * * * *

UNITED STATES PATENT AND TRADEMARK OFFICE
CERTIFICATE OF CORRECTION

PATENT NO. : 6,937,701 B1
APPLICATION NO. : 09/595715
DATED : August 30, 2005
INVENTOR(S) : Barry Gold It is certified that error appears in the above-identified patent and that said Letters Patent is hereby corrected as shown below:

Column 6, line 59, the number "11" should be replaced with --16-1--.

Column 9, line 7, the word "CALLS" should be replaced with --CALLP--.

Column 9, line 64, the number "11" should be replaced with --16-1--.

Column 10, line 3, the word "UVR" should be replaced with --IVR--.

Column 15, line 45, "audibiization" should be replaced with --audibilization--.

Signed and Sealed this

Twenty-third Day of January, 2007

JON W. DUDAS
*Director of the United States Patent and Trademark Office*